(12) United States Patent
Radzevich

(10) Patent No.: US 8,146,458 B2
(45) Date of Patent: Apr. 3, 2012

(54) LOCKING DIFFERENTIAL HAVING IMPROVED TORQUE CAPACITY

(75) Inventor: Stephen P. Radzevich, Sterling Heights, MI (US)

(73) Assignee: Eaton Corporation, Southfield, MI (US)

( * ) Notice: Subject to any disclaimer, the term of this patent is extended or adjusted under 35 U.S.C. 154(b) by 339 days.

(21) Appl. No.: 12/509,600

(22) Filed: Jul. 27, 2009

(65) Prior Publication Data

US 2011/0021304 A1    Jan. 27, 2011

(51) Int. Cl.
*F16H 48/12* (2012.01)
(52) U.S. Cl. .......................................... 74/650
(58) Field of Classification Search .................. 475/223, 475/249
See application file for complete search history.

(56) References Cited

U.S. PATENT DOCUMENTS

| | | | |
|---|---|---|---|
| 3,253,483 A | 5/1966 | McCaw | |
| 3,264,900 A | 8/1966 | Hartupee | |
| 3,611,833 A | 10/1971 | Baremor | 74/711 |
| 3,886,813 A | 6/1975 | Baremor | 74/710 |
| 3,906,812 A | 9/1975 | Kagata | |
| 4,136,582 A | 1/1979 | Boor | 74/710 |
| 4,498,355 A | 2/1985 | Schou | 74/650 |
| 4,735,108 A | 4/1988 | Teraoka et al. | |
| 4,754,661 A | 7/1988 | Barnett | 74/459.5 |
| 4,939,953 A | 7/1990 | Yasui | 475/233 |
| 4,978,329 A | 12/1990 | Yasui et al. | 475/84 |
| 5,019,021 A | 5/1991 | Janson | 475/150 |
| 5,413,015 A | 5/1995 | Zentmyer | 74/650 |
| 5,715,733 A | 2/1998 | Dissett | 74/650 |
| 5,727,430 A | 3/1998 | Valente | 74/650 |
| 5,823,908 A | 10/1998 | Stefanek | 475/230 |
| 5,901,618 A | 5/1999 | Tyson et al. | 74/650 |
| 6,062,105 A | 5/2000 | Tyson et al. | 74/650 |
| 6,083,134 A | 7/2000 | Godlew | 475/231 |
| 6,105,465 A | 8/2000 | Tyson et al. | 74/650 |
| 6,374,701 B1 | 4/2002 | Tittjung | |
| 6,394,927 B1 | 5/2002 | Bongard | 475/231 |
| 6,463,830 B1 * | 10/2002 | Ito et al. | 74/650 |
| 6,688,194 B2 | 2/2004 | Dissett et al. | 74/650 |
| 6,884,196 B1 | 4/2005 | Ziech | 475/230 |

(Continued)

FOREIGN PATENT DOCUMENTS

EP            0091747 A2    10/1983

(Continued)

*Primary Examiner* — Edwin A Young
(74) *Attorney, Agent, or Firm* — Bliss McGlynn, P.C.

(57) ABSTRACT

A locking differential for an automotive vehicle including a housing and a differential mechanism supported in the housing. The differential mechanism includes a pair of clutch members disposed in spaced axial relationship with respect to each other wherein each clutch member includes a groove disposed in an opposed inwardly directing face that is adapted to receive a cross pin. Each of the grooves includes a working surface extending laterally relative to each other. Each of the working surfaces defines a screw involute surface such that the cross pin contacts the working surface along a line extending in the direction of the cross pin in the event of differential rotation of an axle half shaft relative to the housing. Alternatively, each of the working surfaces defines a slightly convex surface in one plane such that the cross pin contacts the working surface at a point defined thereon. In another embodiment, the working surface defines a slightly convex surface in two planes such that the cross pin contacts the working surface at a point defined thereon.

17 Claims, 7 Drawing Sheets

U.S. PATENT DOCUMENTS

| | | |
|---|---|---|
| 7,178,420 B2 | 2/2007 | Barth .......................... 74/459.5 |
| 7,264,569 B2 | 9/2007 | Fox .............................. 475/241 |
| 2003/0066386 A1 | 4/2003 | Dissett et al. ................. 74/650 |
| 2004/0237689 A1 | 12/2004 | Hiltbrand ...................... 74/457 |
| 2005/0288144 A1 | 12/2005 | Wang et al. .................. 475/221 |
| 2008/0103008 A1 | 5/2008 | Gleasman et al. ............ 475/226 |
| 2008/0190240 A1* | 8/2008 | Dissett et al. ................. 74/650 |

FOREIGN PATENT DOCUMENTS

| | | |
|---|---|---|
| EP | 0683333 A1 | 11/1995 |
| EP | 1767817 A1 | 3/2007 |
| EP | 1898124 A2 | 3/2008 |
| FR | 769239 | 8/1934 |
| FR | 2382627 A1 | 9/1978 |
| WO | 2005111471 A1 | 11/2005 |

* cited by examiner

LOCKING DIFFERENTIAL HAVING IMPROVED TORQUE CAPACITY

BACKGROUND OF THE INVENTION

1. Field of the Invention

The present invention relates, generally, to locking differentials for automotive vehicles, and more specifically to features of a locking differential that result in increased torque capacity and density for a given size of the differential.

2. Description of the Related Art

Locking differentials of the type contemplated by the present invention are employed as a part of a drive train and generally include a pair of clutch members supported for rotation in a housing. A pair of side gears are splined for rotation to corresponding axle half shafts. A clutch mechanism is interposed between the clutch members and the side gears. A cross pin is operatively mounted for rotation with the housing and is received in a pair of opposed grooves formed on the inwardly facing surfaces of the clutch members. In the event of excess differential rotation between the axle half shafts, such as when one tire is supported on a slippery surface, the cross pin acts on the associated clutch member to engage the clutch mechanism thereby coupling the pair of axle half shafts together.

While locking differentials of this type have generally worked for their intended purposes, certain disadvantages remain. More specifically, the size of the components of the differential are often dictated by the amount of torque that can be transmitted thereby. Higher torque requirements typically require larger, more robust components such as the cross pin, clutch members, etc. This design limitation ultimately increases the cost of a differential for the given amount of torque capacity and density required in any application.

Thus, there remains a need in the art for a locking differential that is designed so as to increase its torque capacity and density without the need for increasing the size of the related components, thereby reducing the cost of the differential.

SUMMARY OF THE INVENTION

The present invention overcomes the disadvantages in the related art in a locking differential for an automotive vehicle that includes a housing and a differential mechanism supported in the housing. The differential mechanism includes a pair of clutch members disposed in spaced axial relationship with respect to one another and operatively supported for rotation with the housing. A pair of side gears is operatively adapted for rotation with a corresponding pair of axle half shafts. A pair of clutch mechanisms is operatively disposed between the corresponding pair of clutch members and the side gears. The clutch members are axially moveable within the housing to engage a respective clutch mechanism to couple the axle half shafts together in the event of a predetermined amount of differential movement between the axle half shafts. Each of the pair of clutch members presents an inwardly directed face. Each face includes a groove disposed in facing relationship with respect to the other. A cross pin is received in the grooves and operatively connected for rotation with the housing. Each of the grooves includes a pair of working surfaces extending laterally relative to each other. In one embodiment of the present invention, the working surfaces define a screw involute surface such that the cross pin contacts the working surfaces along a line extending in the direction of the cross pin in the event of differential rotation of an axle half shaft. In another embodiment of the present invention, the working surfaces define a slightly convex surface in one plane such that the cross pin contacts the working surface at a point defined thereon in the event of differential rotation of one axle half shaft. In still another embodiment of the present invention, the working surfaces define a slightly convex surface in two planes such that the cross pin contacts the working surface at a point defined thereon in the event of differential rotation of one axle half shaft.

In this way, the locking differential of the present invention employs clutch members having working surfaces having screw involute working surfaces that allow for line contact between the cross pin and the working surface; a working surface that may be slightly convex in one plane; or a working surface that may be topologically modified to be slightly convex in two planes that allows for point contact between the cross pin and the working surface. This structure significantly reduces the edge stress generated by the interaction of the cross pin and the working surface and thereby increases the torque density that may be generated through the differential for a given size of the cross pin and clutch member. Accordingly, the present invention reduces the necessity of increasing the size of the related component and by association the cost of the differential for a given torque capacity of the differential.

BRIEF DESCRIPTION OF THE DRAWINGS

Other objects, features and advantages of the present invention will be readily appreciated, as the same becomes better understood after reading the subsequent description taken in connection with the accompanying drawings wherein.

DETAILED DESCRIPTION

Figure 1:
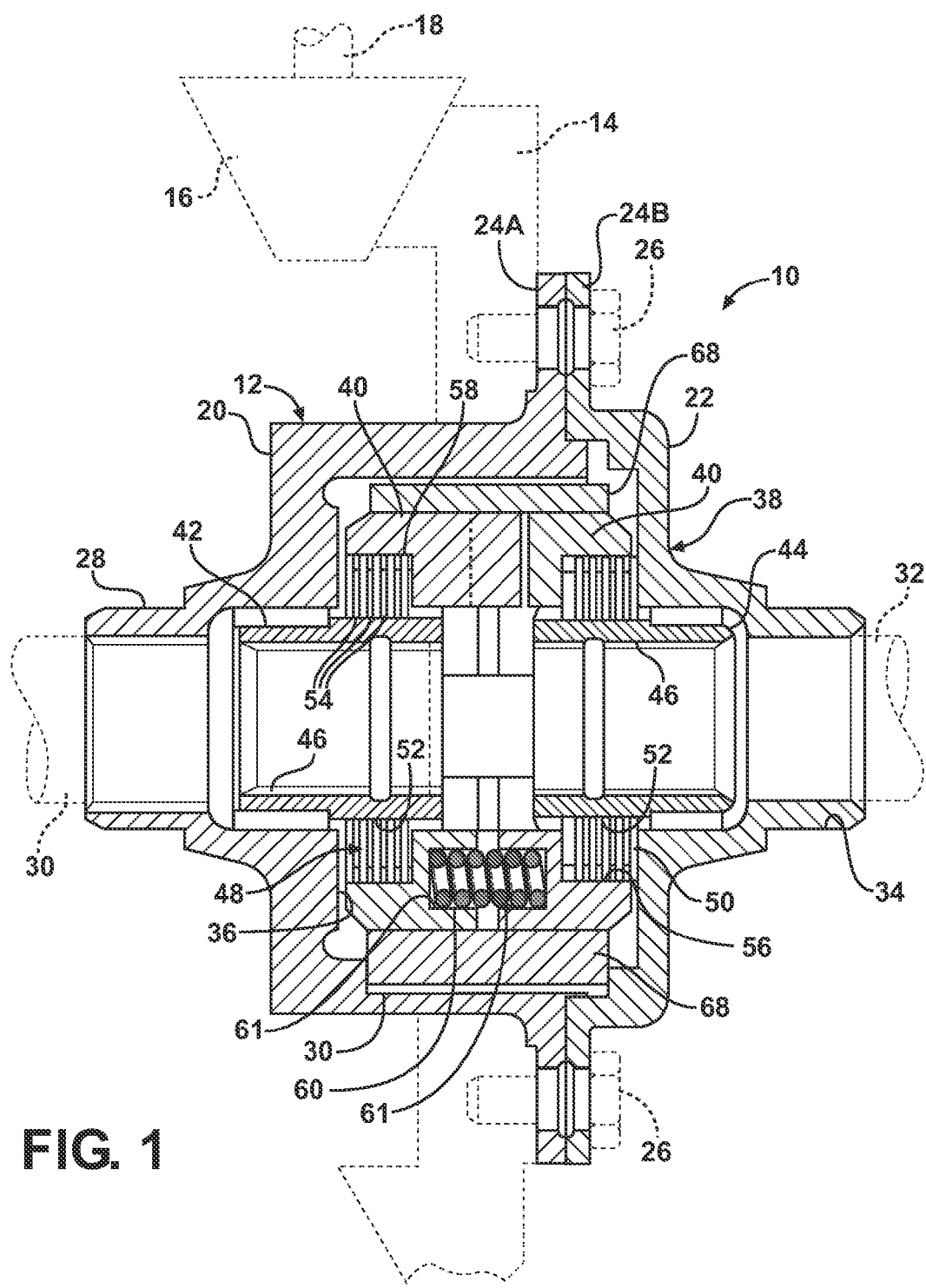
FIG. 1 is a cross-sectional side view of a locking differential illustrating a driveshaft, pinion gear and ring gear of the drive train in phantom.
Figure 2:
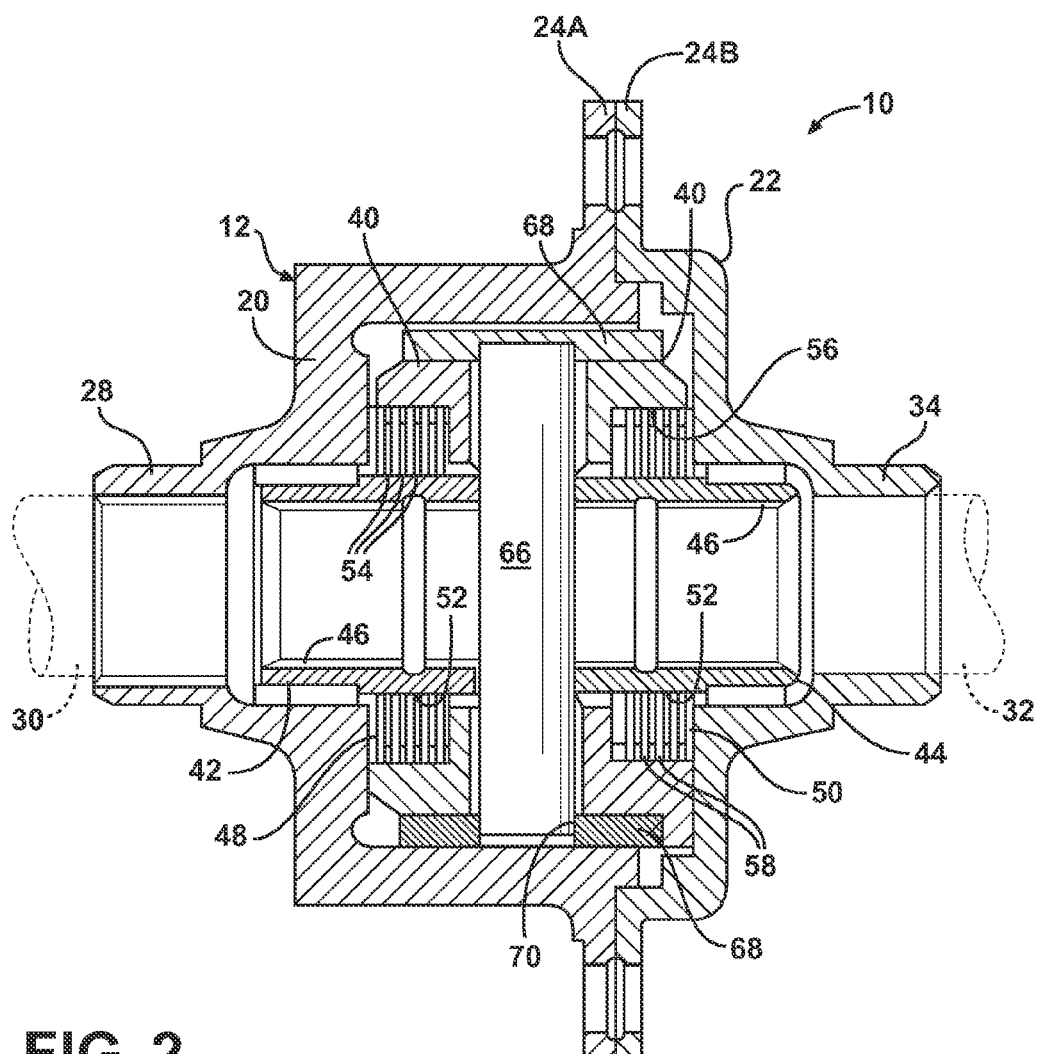
FIG. 2 is a cross-sectional side view of a locking differential illustrating the disposition of the cross pin relative to the clutch members.

One embodiment of a locking differential of the type contemplated by the present invention is generally indicated at 10 in FIGS. 1-2. The locking differential 10 is designed to be employed as a part of a drive train for any number of vehicles having a power plant that is used to provide motive force to the vehicle. Thus, the differential 10 includes a housing, generally indicated at 12. The housing 12 may support a ring gear 14 that is designed to be driven in meshing relationship with the pinion gear 16 fixed to a drive shaft 18. The ring gear 14, pinion 16 and driveshaft 18 are shown in phantom in FIG. 1. The housing 12 may be composed of a main body 20 and a cap 22 that is fixedly mounted to the main body 20 at a pair of mating annular flange portions 24A and 24B via bolts 26 or any other suitable fastening mechanism. The ring gear 14 may also be mounted to the housing 12 at the mating flanges 24A, 24B via the fastener 26. Those having ordinary skill in the art will appreciate from the description that follows that the housing may be defined by any conventional structure known in the related art and that the present invention is not limited to a housing defined by a main body and a cap portion. Similarly, the housing 12 may be driven by any conventional drive mechanism known in the related art and that the invention is not limited to a housing that is driven via a ring gear, pinion, and drive shaft.

The main body 20 defines a hub 28 that supports one 30 of the pair of axle half shafts 30, 32. Similarly, the cap 22 defines an opposed hub 34 that supports the other one 32 of a pair of axle half shafts. Together, the main body 20 and cap 22 of the housing 12 cooperate to define a cavity 36. A differential mechanism, generally indicated at 38, is supported in the cavity 36 defined by the housing 12. The differential mechanism 38 is also illustrated in the exploded view of FIG. 3 and includes a pair of clutch members 40 disposed in spaced axial relationship with respect to one another. The clutch members 40 are operatively supported for rotation with the housing 12. A pair of side gears 42, 44 is operatively adapted for rotation with a corresponding one of the pair of axle half shafts 30, 32. To this end, the side gears 42, 44 define splines 46 on the inner circumference thereof that are matingly received in corresponding splines defined on the axle half shafts 30, 32. A pair of clutch mechanisms, generally indicated at 48 and 50, is operatively disposed between each corresponding pair of clutch members 40 and side gears 40, 42. To this end, the side gears 42, 44 include splines 52 on the outer circumference thereof. The clutch mechanism 48, 50 includes a plurality of friction disks 54 that are cooperatively splined to the outer circumference of the side gears 42, 44 and are rotatable therewith. Similarly, each of the pair of clutch members 40 includes a plurality of splines 56 formed on the inner circumference thereof. A series of plates 58 are operatively supported on the splined inner circumference 56 of the clutch members 40 and are interleaved between the plurality of friction disks 54 supported on the side gears 42, 44. The pair of clutch members 40 are axially moveable within the housing 12 to engage a respective clutch mechanism 48, 50 to couple their associated axle half shafts 30, 32 together in the event of a predetermined amount of differential movement between the axle half shafts as will be described in greater detail below. One embodiment of the locking differential of the type contemplated by the present invention may also employ a plurality of biasing members 60 that are disposed between the clutch members 40 and receiving in cavities 61 to urge the clutch members 40 away from one another.

Figure 3:
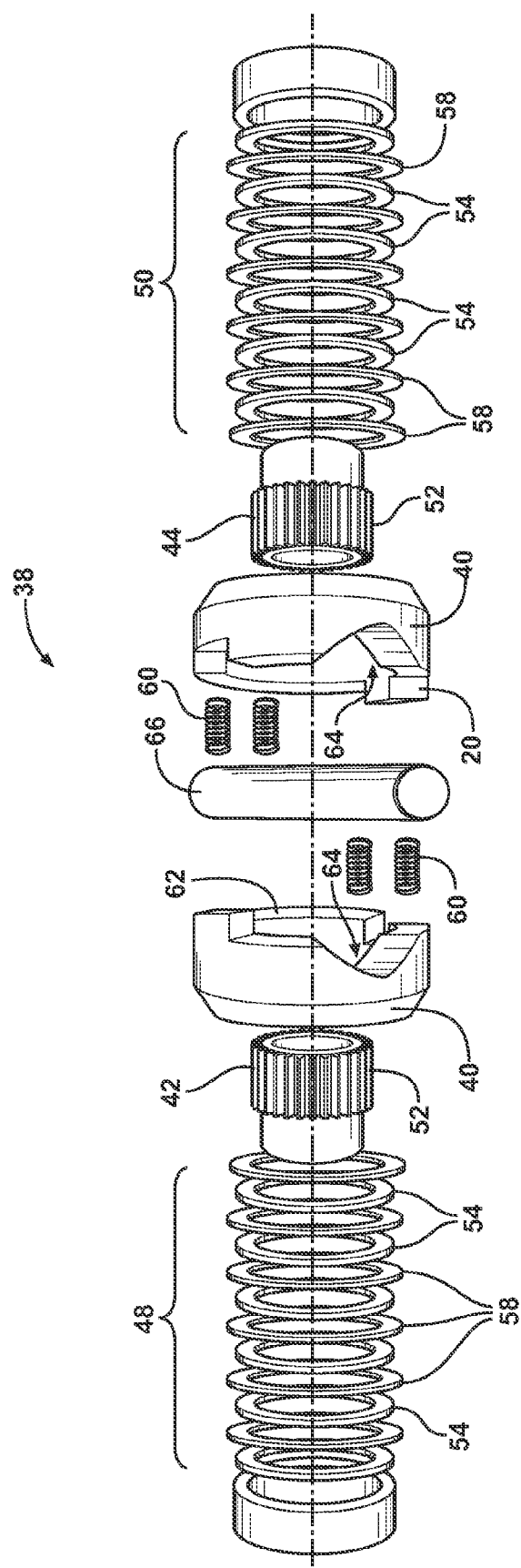
FIG. 3 is an exploded view of the differential mechanism of the present invention.
Figure 4:
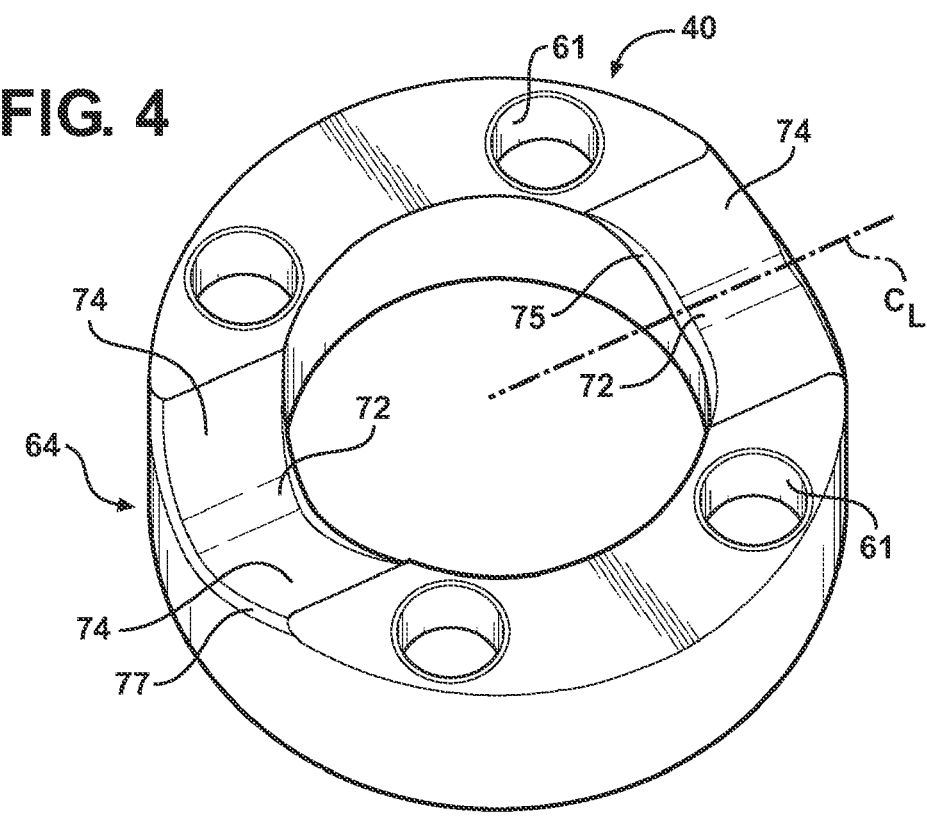
FIG. 4 is a perspective elevational view of a clutch member of the present invention.
Figure 5:
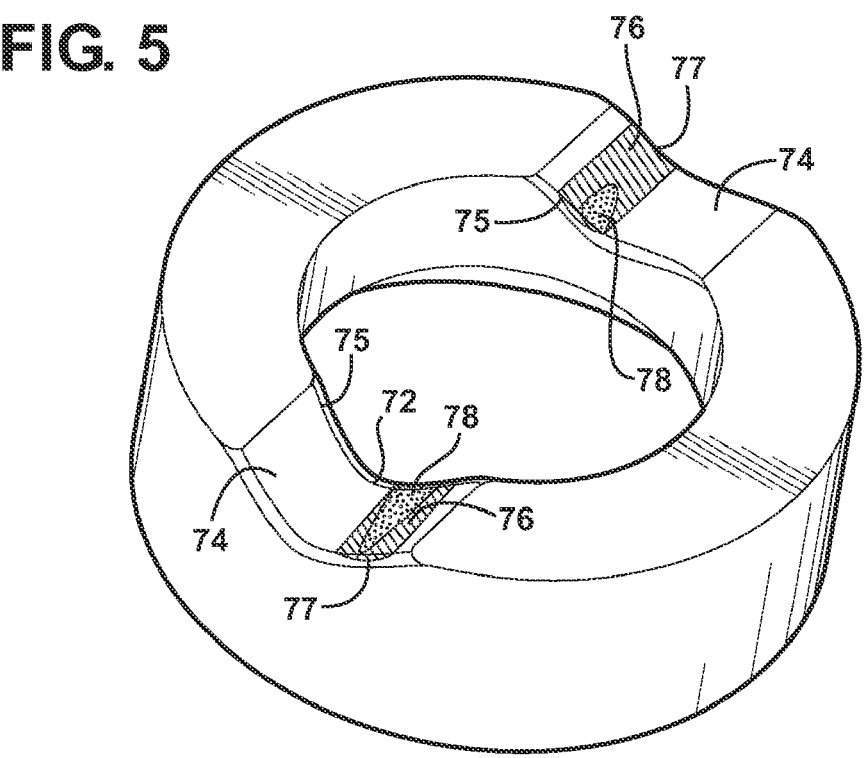
FIG. 5 is a perspective elevational view of a clutch member illustrating the areas of contact between the cross pin and the working surfaces as well as areas of edge stress generated in locking differentials known in the related art.

As best shown in FIGS. 3-5, each of the pair of clutch members 40 presents an inwardly directed face 62 disposed in spaced axial relationship to one another. Each of the inwardly directed faces 62 of the pair of clutch members 40 includes a groove, generally indicated at 64, disposed in facing relationship with respect to the other. A cross pin 66 is received in the grooves 64 and is operatively connected for rotation with the housing 12. To this end, the differential 10 may also include a tubular mounting sleeve 68 (FIGS. 1-2) splined to the inner circumference of the main body 20 of the housing 12. The cross pin 66 may be fixed to the tubular sleeve at corresponding apertures 70 formed in the sleeve 68 for this purpose. However, those having ordinary skill in the art will appreciate from the description set forth herein that the cross pin 66 may be operatively mounted for rotation with the housing 12 in any suitable manner.

Referring now specifically to FIGS. 4-5, each of the grooves 64 is defined by a groove bottom 72 and a pair of working surfaces 74 extending laterally relative to one another. The groove bottom 72 is disposed between and operatively interconnects the pair of working surfaces 74. In addition, in one embodiment, the working surfaces extend at an obtuse angle relative to each other. However, those having ordinary skill in the art will appreciate from the description that follows that the grooves 64 do not necessarily need to define a groove bottom 72 in order to function in the way intended by the present invention. The working surfaces also define inner and outer radial edges 75, 77, respectively. In its operative mode, the cross pin 66 engages the working surfaces 74 to drive the clutch members 40 axially outwardly to thereby engage the clutch mechanisms 48, 50 and couple the axle half shafts 30, 32 together as will be described in greater detail below.

More specifically, the locking differential 10 of the type described above allows for a certain amount of limited slip between the axle half shafts 30, 32 to which it is mounted. However, in an automotive context, for example, when one of the tires is solidly supported and the other one is slipping (such as when one tire is on the pavement and the other is supported on a slippery surface, such as ice) the differential acts to transfer torque from the slipping tire to the solidly supported tire. This occurs when the cross pin 66 engages the working surfaces 74 of the groove 64 disposed on opposite sides of the centerline $C_L$ of the groove 64 to move the associated clutch member 40 into engagement with an associated clutch mechanism 48, 50 thereby coupling the axle half shafts 30, 32 of the spinning tire to the other solidly supported shaft. In this way, torque is transferred from the slipping tire to the solidly supported tire thereby allowing the vehicle to be driven even though one of the tires is slipping. The opposed working surfaces 74 that are engaged by the cross pin 66 in this operational embodiment are shaded as designated at 76 in FIG. 5 and are disposed on opposite sides of a centerline $C_L$ bisecting the groove 64 (FIG. 4).

When there is differential movement of the axle half shafts supported by the locking differential of the type known in the prior art, the cross pin and the working surface of the groove operate to create areas of increased stress at the radial edges of the working surface. These areas of increased stress are illustrated in the arcuately stippled portions indicated at 78 illustrated in FIG. 5. These areas of increased stress 78 limit the amount of torque that can be generated for a given size of differential. Thus, where increased torque is required for any given application, the clutch members and cross pins must be increased in size and thickness and may also require additional heat treat and other processes in order to handle the increased torque applied to the differential.

On the other hand, the locking differential 10 of the present invention employs a groove 64 with specially designed working surfaces 74 that are calculated to eliminate or reduce the edge stress at the radial edges of the working surfaces. Thus, a locking differential 10 employing the specially designed working surfaces of the present invention is capable of transmitting more torque for a given size of differential, thereby reducing the cost of manufacturing the differential.

Figure 6A:
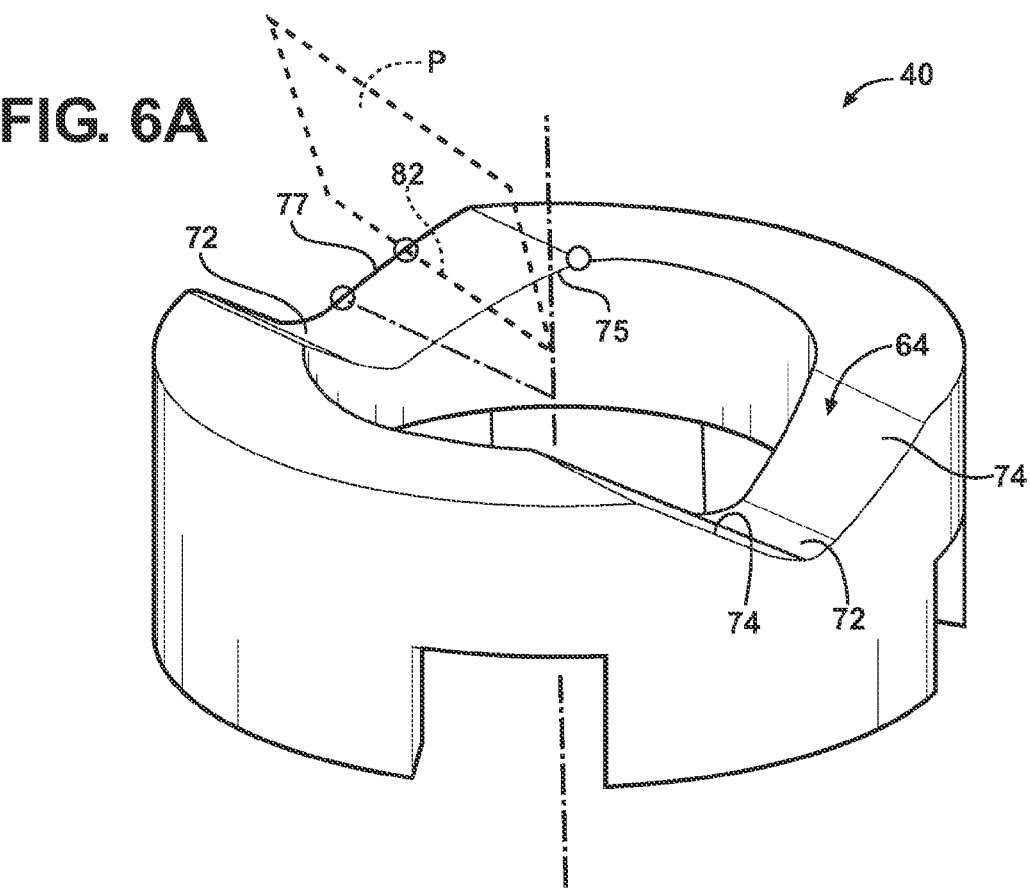
FIG. 6A is a perspective elevational view of one embodiment of the clutch member of the present invention illustrating a screw involute working surface.
Figure 6B:
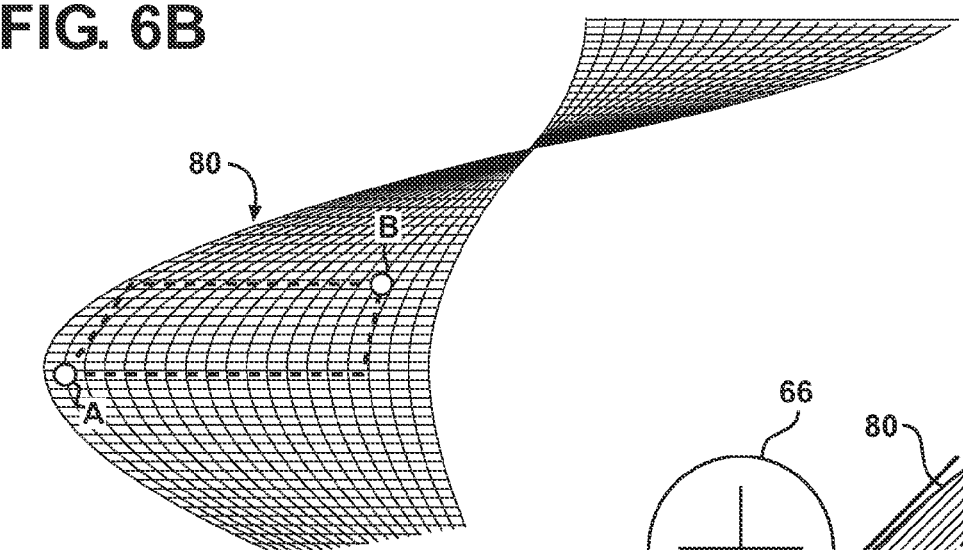
FIG. 6B illustrates the generation of a screw involute surface.
Figure 6C:
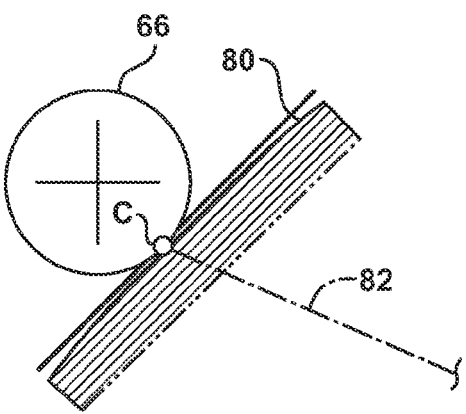
FIG. 6C is a cross-sectional end view illustrating the line contact between a cross pin and a screw involute working surface.

More specifically, and referring now to FIGS. 6A-6C, one embodiment of the locking differential of the present invention employs working surfaces 74 that define a screw involute surface representatively designated at 80 in FIG. 6B. In this case, the cross pin 66 will contact the screw involute working surface 80 along a line 82 extending in the direction of the cross pin 66 in the event of differential rotation of an axle half shaft relative to the housing 12. More specifically, and with continuing reference to FIG. 6A-6C, the screw involute surface 80 defines an imaginary point A located near the outer radial edge 77 of the clutch member 40 adjacent to the groove bottom 72 and an imaginary point B located near the inner radial edge 75 of the clutch member 40 remote from the groove bottom 72. The screw involute surface 80 is slightly convex between the imaginary points A and B such that an imaginary plane P may be defined orthogonal to the working surface 74 and intersects an imaginary point C at the outer radial edge 77 of the working surface 74. The imaginary plane P defines a line 82 extending radially across the working surface. In this operative mode, and as noted above with reference to FIG. 4, the cross pin 66 engages the working surfaces 74 disposed on opposite sides of the center line illustrated in that figure. The use of screw involute working surfaces 80 produces line contact between the cross pin 66 and the working surface 74 thereby substantially reducing the problem of edge stress generated by the interaction of the cross pin 66 and the working surfaces 74. However, it is also true that, while ideal, screw involute working surfaces are difficult to manufacture. Thus, those having ordinary skill in the art will appreciate that the use of theoretically perfect screw involute working surfaces may not be completely practical in a commercial embodiment of the present invention.

Figure 7A:
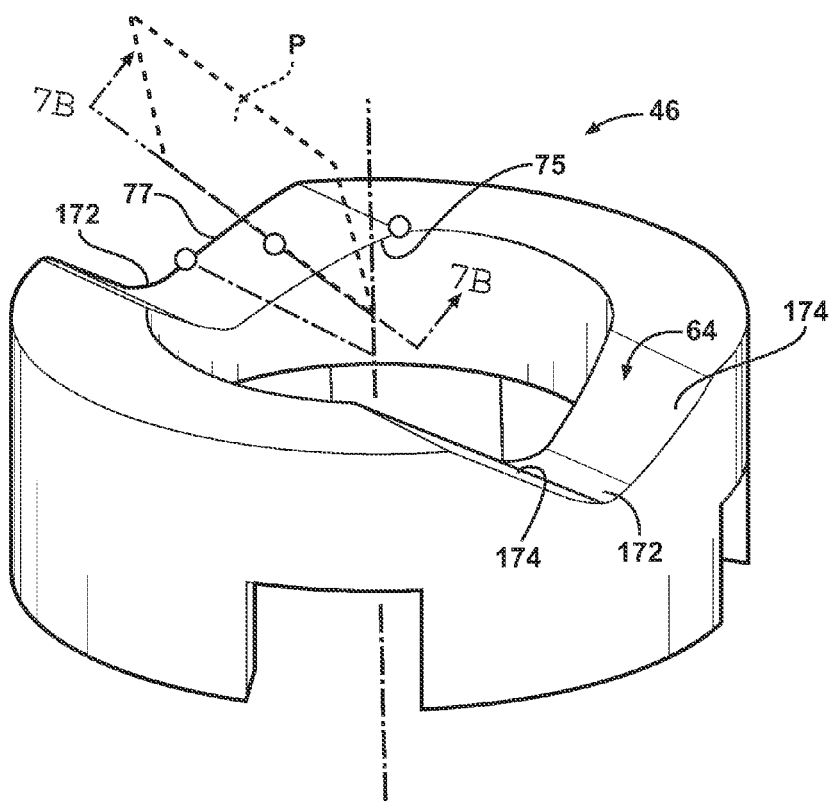
FIG. 7A is a perspective elevational view of a clutch member of the present invention illustrating a working surface that is slightly convex in one plane.
Figure 7B:
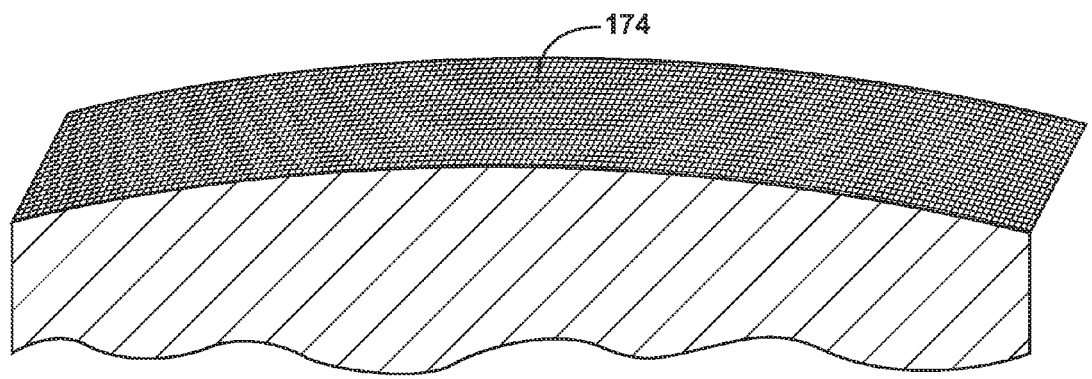
FIG. 7B is an enlarged representative cross-sectional view taken along lines 7B-7B of FIG. 7A illustrating the slightly convex working surface in one plane.

In recognition of this difficulty, FIGS. 7A-7B disclose another embodiment of the present invention where like numbers are used to designate like structure and same are increased by 100. This embodiment also reduces the edge stress generated between the cross pin 66 and the working surfaces 174 but is more feasible to manufacture in a commercial embodiment. More specifically, the working surfaces 174 defined in FIGS. 7A and 7B are slightly convex in one plane, such that the cross pin 66 contacts the working surface at an imaginary point F defined thereon in the event of differential rotation of an axle half shaft relative to the housing. For example, and as illustrated in these figures, the working surface 174 defines an imaginary point D located near the outer radial edge 77 of the clutch member 40 adjacent to the groove bottom 72 and an imaginary point E located near the inner radial edge 77 of the clutch member 40 remote from the groove 72. The working surface is slightly convex between the imaginary points D and E such that an imaginary plane P defined orthogonal to the working surface 174 intersects an imaginary point F on the working surface. The cross pin 66 establishes point contact between the annular surface of the cross pin 66 and the working surface 174 of the clutch member 40. In this context, and as best representatively illustrated in FIG. 7B, the radius of convexivity of the working surface 174 should be as large as possible. A large radius of curvature of the convex working surface 174 substantially reduces the edge stress on these surfaces.

Figure 8A:
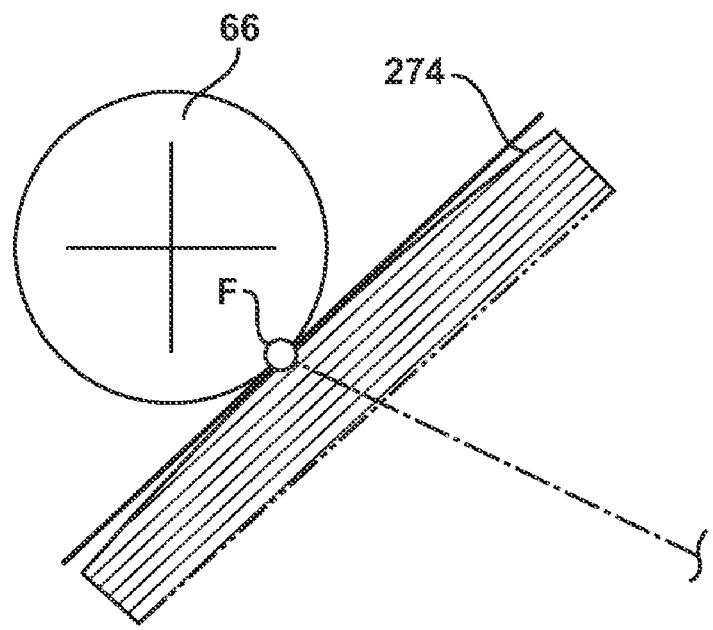
FIG. 8A is cross-sectional end view illustrating the contact between a cross pin and a working surface that is slightly convex in two planes.
Figure 8B:
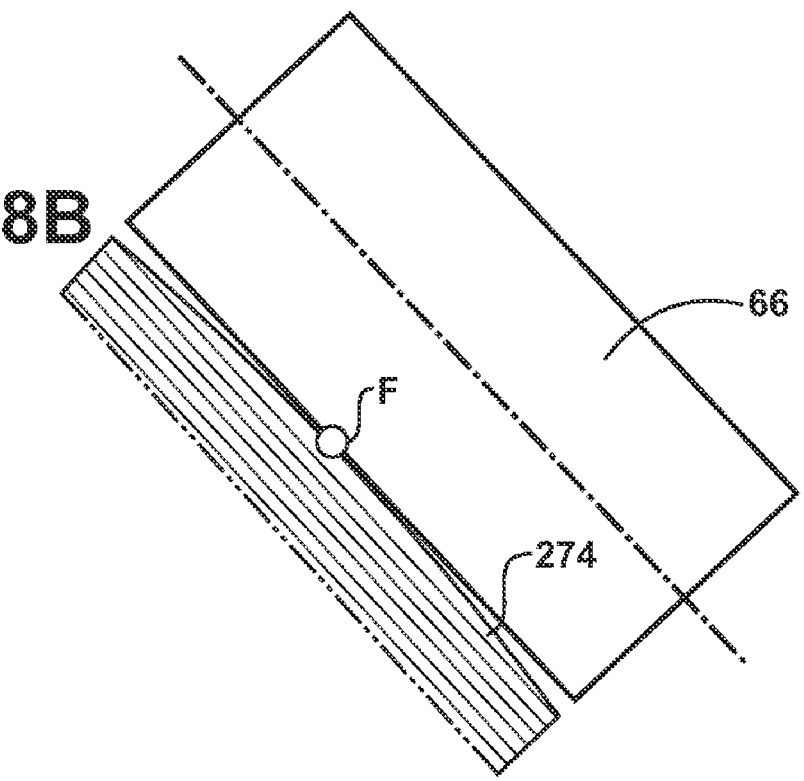
FIG. 8B is cross-sectional side view illustrating the contact between a cross pin and a working surface that is slightly convex in two planes.

Another embodiment of the working surface of the locking differential of the present invention is also illustrated in FIGS. 8A and 8B where like numerals are used to designate like structure and where same reference numbers have been increased by 200 relative to the embodiment illustrated in FIGS. 6A-6C. In this embodiment, the working surfaces 274 have been topologically modified so that they are slightly convex in two planes. In this embodiment, the cross pin 66 will contact the working surface at an imaginary point F defined thereon during differential rotation of the clutch member relative to the housing.

In this way, the locking differential of the present invention employs clutch members having working surfaces having screw involute working surfaces that allow for line contact between the cross pin and the working surface; a working surface that may be slightly convex in one plane; or a working surface that may be topologically modified to be slightly convex in two planes that allows for point contact between the cross pin and the working surface. This structure significantly reduces the edge stress generated by the interaction of the cross pin and the working surface and thereby increases the torque density that may be generated through the differential for a given size of the cross pin and clutch member. Accordingly, the present invention reduces the necessity of increasing the size of the related component and by association the cost of the differential for a given torque capacity of the differential.

The invention has been described in great detail in the foregoing specification, and it is believed that various alterations and modifications of the invention will become apparent to those having ordinary skill in the art from a reading and understanding of the specification. It is intended that all such alterations and modifications are included in the invention, insofar as they come within the scope of the appended claims.

I claim:

1. A locking differential for automotive vehicle comprising:
    a housing and a differential mechanism supported in said housing, said differential mechanism including a pair of clutch members disposed in spaced axial relationship with respect to one another and operatively supported for rotation with said housing;
    a pair of side gears operatively adapted for rotation with a corresponding pair of axle half shafts, and a pair of clutch mechanisms operatively disposed between each corresponding pair of clutch members and said side gears;
    said pair of clutch members being axially moveable within said housing to engage a respective clutch mechanism to couple the axle half shafts together in the event of a predetermined amount of differential movement between the axle half shafts;
    each of said pair of clutch members presenting an inwardly directed face, each face including a groove disposed in facing relationship with respect to the other, and a cross pin received in said grooves and operatively connected for rotation with said housing;
    each of said grooves including a pair of working surfaces extending laterally relative to the other, each of said working surfaces defining a screw involute surface such that said cross pin contacts said working surfaces along a line extending in the direction of the cross pin in the event of differential rotation of an axle half shaft relative to said housing.

2. A locking differential as set forth in claim 1 wherein said groove includes a groove bottom disposed between and that interconnects said pair of working surfaces.

3. A locking differential as set forth in claim 2 wherein said screw involute surface defines an imaginary point A located near the outer radial edge of said clutch member adjacent said groove bottom and an imaginary point B located near the inner radial edge of said clutch member remote from said groove, said screw involute surface being slightly convex between said imaginary points A and B such that an imaginary plane C defined orthogonal to said working surface defines a line extending radially across said working surface.

4. A locking differential as set forth in claim 1 wherein said working surfaces extend at an obtuse angle relative to each other.

5. A locking differential as set forth in claim 1 wherein said clutch mechanism includes a friction clutch member having a plurality of friction disks supported for rotation with said side gear and a plurality of plates supported for rotation with a corresponding one of said clutch members and interleaved between said plurality of friction disks, said clutch mechanism operable to be compressed to engage said friction disks with said adjacent plates to couple said clutch member to an associated one of said side gears.

6. A locking differential as set forth in claim 1 wherein said groove defines a centerline and said cross pin engages working surfaces disposed on opposite sides of said centerline.

7. A locking differential for automotive vehicle comprising:
a housing and a differential mechanism supported in said housing, said differential mechanism including a pair of clutch members disposed in spaced axial relationship with respect to one another and operatively supported for rotation with said housing;
a pair of side gears operatively adapted for rotation with a corresponding pair of axle half shafts, and a pair of clutch mechanisms operatively disposed between each corresponding pair of clutch members and said side gears;
said pair of clutch members being axially moveable within said housing to engage a respective clutch mechanism to couple the axle half shaft together in the event of a predetermined amount of differential movement between the axle half shafts;
each of said pair of clutch members presenting an inwardly directed face, each face including a groove disposed in facing relationship with respect to the other, and a cross pin received in said grooves and operatively connected for rotation with said housing;
each of said grooves including a pair of working surfaces extending laterally relative to each other, each of said working surfaces defining a slightly convex surface in one plane such that said cross pin contacts said working surface at a point defined thereon in the event of differential rotation of an axle half shaft relative to said housing.

8. A locking differential as set forth in claim 7 wherein said groove includes a groove bottom that interconnects said pair of working surfaces.

9. A locking differential as set forth in claim 8 wherein each of said working surfaces defines an imaginary point D located near the outer radial edge of said clutch member adjacent said groove bottom and an imaginary point E located near the inner radial edge of said clutch member remote from said groove, said working surfaces being slightly convex between said imaginary points D and E such that an imaginary plane defined orthogonal to said working surface intersects an imaginary point F on said working surface.

10. A locking differential as set forth in claim 8 wherein said working surfaces extend at an obtuse angle relative to each other.

11. A locking differential as set forth in claim 8 wherein said clutch mechanism includes a friction clutch member having a plurality of friction disks supported for rotation with said side gear and a plurality of plates supported for rotation with a corresponding one of said clutch members and interleaved between said plurality of friction disks, said clutch mechanism operable to be compressed to engage said friction disks with said adjacent plates to couple said clutch member to an associated one of said side gears.

12. A locking differential as set forth in claim 8 wherein said groove defines a centerline and said cross pin engages working surfaces disposed on opposite sides of said centerline.

13. A locking differential for automotive vehicle comprising:
a housing and a differential mechanism supported in said housing, said differential mechanism including a pair of clutch members disposed in spaced axial relationship with respect to one another and operatively supported for rotation with said housing;
a pair of side gears operatively adapted for rotation with a corresponding pair of axle half shafts, and a pair of clutch mechanisms operatively disposed between each corresponding pair of clutch members and said side gears;
said pair of clutch members being axially moveable within said housing to engage a respective clutch mechanism to couple the axle half shaft together in the event of a predetermined amount of differential movement between the axle half shafts;
each of said pair of clutch members presenting an inwardly directed face, each face including a groove disposed in facing relationship with respect to the other, and a cross pin received in said grooves and operatively connected for rotation with said housing;
each of said grooves including a pair of working surfaces extending laterally relative to each other, each of said working surfaces defining a slightly convex surface in two planes such that said cross pin contacts said working surface at a point defined thereon in the event of differential rotation of an axle half shaft relative to said housing.

14. A locking differential as set forth in claim 13 wherein said groove includes a groove bottom that interconnects said pair of working surfaces.

15. A locking differential as set forth in claim 14 wherein said working surfaces extend at an obtuse angle relative to each other.

16. A locking differential as set forth in claim 14 wherein said clutch mechanism includes a friction clutch member having a plurality of friction disks supported for rotation with said side gear and a plurality of plates supported for rotation with a corresponding one of said clutch members and interleaved between said plurality of friction disks, said clutch mechanism operable to be compressed to engage said friction disks with said adjacent plates to couple said clutch member to an associated one of said side gears.

17. A locking differential as set forth in claim 14 wherein said groove defines a centerline and said cross pin engages working surfaces disposed on opposite sides of said centerline.

* * * * *